US012607047B2

(12) United States Patent
Hunt et al.

(10) Patent No.: US 12,607,047 B2
(45) Date of Patent: Apr. 21, 2026

(54) MOTOR VEHICLE LATCH

(71) Applicant: Kiekert AG, Heiligenhaus (DE)

(72) Inventors: Rob Hunt, Davisburg, MI (US); Robert Pettengill, Farmington, MI (US)

(73) Assignee: Kiekert AG, Heiligenhaus (DE)

( * ) Notice: Subject to any disclaimer, the term of this patent is extended or adjusted under 35 U.S.C. 154(b) by 276 days.

(21) Appl. No.: 18/159,713

(22) Filed: Jan. 26, 2023

(65) Prior Publication Data

US 2024/0254814 A1 Aug. 1, 2024

(51) Int. Cl.

| | |
|---|---|
| ***E05B 81/72*** | (2014.01) |
| ***E05B 81/00*** | (2014.01) |
| ***E05B 81/64*** | (2014.01) |
| ***E05B 81/74*** | (2014.01) |
| ***E05B 85/02*** | (2014.01) |
| ***E05F 15/70*** | (2015.01) |

(52) U.S. Cl.

CPC .............. *E05B 81/72* (2013.01); *E05B 81/01* (2013.01); *E05B 81/64* (2013.01); *E05B 81/74* (2013.01); *E05F 15/70* (2015.01); *E05B 85/02* (2013.01); *E05Y 2900/55* (2013.01)

(58) Field of Classification Search

CPC .......... E05B 81/01; E05B 81/13; E05B 81/64; E05B 81/72; E05B 81/74; E05B 81/76

See application file for complete search history.

(56) References Cited

U.S. PATENT DOCUMENTS

| | | | | |
|---|---|---|---|---|
| 5,535,607 | A * | 7/1996 | Dzurko | E05B 81/64 70/264 |
| 5,810,423 | A * | 9/1998 | Brackmann | E05B 81/64 49/72 |
| 10,392,838 | B2 * | 8/2019 | Tomaszewski | E05B 81/76 |
| 11,384,572 | B2 * | 7/2022 | Enomoto | E05B 81/76 |
| 11,414,903 | B2 * | 8/2022 | Patane | E05B 81/76 |
| 11,499,348 | B2 * | 11/2022 | Seo | E05B 81/64 |
| 11,891,842 | B2 * | 2/2024 | Yoda | E05B 81/72 |
| 2011/0214460 | A1 * | 9/2011 | Byun | E05B 81/00 70/91 |
| 2018/0023325 | A1 * | 1/2018 | Takagi | E05B 81/64 292/259 A |
| 2023/0366247 | A1 * | 11/2023 | Nonomura | E05B 81/72 |

FOREIGN PATENT DOCUMENTS

| | | | | |
|---|---|---|---|---|
| CN | 105735790 | A * | 7/2016 | |
| DE | 19547582 | A1 | 6/1997 | |
| DE | 10014321 | A1 * | 9/2001 | E05B 77/28 |
| DE | 102011119369 | A1 | 5/2012 | |

(Continued)

*Primary Examiner* — Alyson M Merlino

(74) *Attorney, Agent, or Firm* — Renner, Otto, Boisselle & Sklar, LLP

(57) ABSTRACT

A motor vehicle latch, in particular to a motor vehicle door latch, is equipped with an actuating lever chain having at least one actuating lever for opening a locking mechanism. Also provided is a linearly displaceable actuating slide and a sensor that can be acted upon by the actuating lever via the actuating slide. According to the invention, a spring is assigned to the actuating slide such that the sensor is permanently acted upon, with only an opening movement of the actuating lever lifting the actuating slide from the sensor.

16 Claims, 2 Drawing Sheets

(56) References Cited

FOREIGN PATENT DOCUMENTS

| | | | | |
|---|---|---|---|---|
| EP | 3081730 | B1 | | 10/2018 |
| KR | 19980048798 | U | * | 10/1998 |
| KR | 20110100362 | A | * | 9/2011 |
| KR | 101308494 | B1 | * | 9/2013 |
| KR | 101513000 | B1 | * | 4/2015 |

* cited by examiner

MOTOR VEHICLE LATCH

FIELD OF DISCLOSURE

The invention relates to a motor vehicle latch, in particular to a motor vehicle door latch, comprising an actuating lever chain having at least one actuating lever for opening a locking mechanism, further comprising a linearly movable actuating slide, and comprising a sensor that can be acted upon by the actuating lever via the actuating slide.

BACKGROUND OF DISCLOSURE

Sensors in such motor vehicle latches are typically used to initiate or query latch functions or to sense operations. In the latter case, the sensor in question is used, for example, to determine an opening movement of the actuating lever for opening the locking mechanism. Activities within the motor vehicle latch can then in turn be derived from this signal, for example to act upon an opening drive. In general and according to the state of the art relevant at this point according to DE 10 2011 119 369 A1, the signal from the sensor is used in connection with a window lowering system.

In fact, the known teaching proceeds in such a way that the sensor in question is acted upon by means of an unlocking lever. The unlocking lever is in turn moved via an inside actuating lever or an outside actuating lever. In this way, a change in position of the unlocking lever can be detected by means of the sensor. A glass lowering mechanism of the known window lowering system is now designed in such a way that the sensor detects the incipient change in position of the unlocking lever and ensures that the glass is moved into the lowered position even before the lock is released, i.e., ultimately, the locking mechanism is opened. This has proven itself in principle, but, on the one hand, it is technologically complex and, on the other hand, it requires that the sensor must be acted upon by the unlocking lever that in turn is arranged in the immediate surroundings of an inside actuating lever or an outside actuating lever.

DE 195 47 582 A1 relates to a motor vehicle door that is equipped with an additional control switch for the lowering movement of a door window pane. The control switch in question is acted upon by means of a pivoting switch lever. On the one hand, the switch lever has a switch contour for actuating the control switch and, on the other hand, it extends into the region of a rotary latch. The rotary latch in turn has a switch contour which holds the switch lever when the rotary latch is in the open position. This requires a modification of the locking mechanism or sufficient space in this region.

Within the scope of the generic prior art according to EP 3 081 730 B1, the focus is on a door system for a vehicle which functionally couples a door latch and a power window to one another in a combinatory manner. In this context, an intelligent lever designed as an actuating slide is also implemented. In the closed position of the known motor vehicle latch, the actuating slide in question is free of the sensor in question and consequently does not act thereupon. The sensor is only acted upon when the open position is to be assumed. Such an embodiment is advantageous in itself because the movement of the actuating lever can also be transmitted over relatively long distances via the actuating slide and, in particular, takes into account the typical L-shaped cross-sectional character of such a motor vehicle latch. However, any malfunctions or problems with the operation of the sensor cannot be controlled in this way. The reason is that the sensor is only acted upon when the door is opened. The invention as a whole seeks to remedy this.

SUMMARY OF DISCLOSURE

The invention is based on the technical problem of further developing such a motor vehicle latch and in particular a motor vehicle door latch such that the functional reliability is improved overall compared to the state of the art.

To solve this technical problem, the invention proposes in a generic motor vehicle latch that the actuating slide is assigned a spring such that the sensor is permanently acted upon, with only an opening movement of the actuating lever lifting the actuating slide from the sensor.

In this way, first of all, a structure that is particularly functional and reflects the installation conditions in such a motor vehicle latch is made available. The reason is that the actuating slide makes it possible to be able to transmit the movement of the actuating lever to be detected to a remote location. The invention is based on the finding that the motor vehicle latch according to the invention is typically L-shaped in cross section. While the locking mechanism including the latch case is substantially arranged in one leg of the L, i.e. the latch leg, the other leg of the L, i.e. the electronics leg, connected thereto functions primarily as a sensor and electronics unit. By means of the actuating slide, the movement of the actuating lever can now be easily transferred from the latch leg to the sensor in the electronics leg. In addition, the invention is equipped with a structure that is particularly functional, because the sensor is permanently acted upon by means of the actuating slide, including the associated spring. As a result, when using a sensor designed, for example, as a switch and, in particular, a microswitch, its function or actuation can be permanently checked and malfunctions can be easily detected.

The reason is that the actuation of the sensor by the actuating slide, which is acted upon by means of the spring, usually corresponds to the fact that, in the case of a switch or microswitch, the switch is closed and, in this way, defines a closed circuit, which in turn can be checked, for example, via a control unit. This ensures a permanent function test, and any malfunctions can also be detected immediately. Only when the actuating lever performs an opening movement does this opening movement of the actuating lever ensure that the actuating slide is lifted off the sensor, and consequently the circuit is opened in the example described. This results in a particularly functional operation, which at the same time has a compact and simple set-up. In addition, the specific properties of such motor vehicle latches typically having latch legs and electronics legs can be reproduced particularly advantageously in accordance with the invention. In fact, in connection with the sensor and the actuating slide, practically no significant changes are necessary on the latch leg or on the electronics leg compared to embodiments without this actuating slide and the sensor. Herein lie the substantial advantages.

According to a further advantageous embodiment, both an outside actuating lever and an inside actuating lever are provided as actuating levers. Here, the invention is based on the knowledge that an external drive unit is controlled overall and advantageously by means of the actuating lever via the sensor. This external drive unit can be a power window drive. Here, the invention is based on the knowledge that an action on the outside actuating lever or the inside actuating lever or both levers to open the locking mechanism results immediately in the changing sensor signal. This happens even before the opening movements of the actuating lever in question have resulted in the opening of the locking mechanism. In other words, a sensor that is additionally assigned to the locking mechanism, for example, and which detects the opening of the locking mechanism, would result overall in the drive or power window drive being acted upon “too late”.

As a result, it can be ensured from the sensor signal and the activation of the power window drive derived therefrom that, if necessary, an associated window has been lowered slightly, for example, before the latch and thus the associated motor vehicle door is opened. Moreover, this embodiment ensures that there is no need to differentiate between an opening movement of the inside actuating lever or the outside actuating lever, but rather that any actuation results in the desired lowering of the window in the example. In this case, either an opening movement of the outside actuating lever, or an opening movement of the inside actuating lever, or an opening movement of both levers can lift the actuating slide off the sensor.

For this purpose, according to a further advantageous embodiment, the actuating slide is equipped with a stop contour for the outside actuating lever and with a further and different stop contour for the inside actuating lever. The inside actuating lever can also interact with the actuating slide via a clutch element.

The spring acting on the actuating slide is advantageously designed as a spiral compression spring. In principle, a torsion spring can also be used. In this context, the spiral compression spring has the advantage that it exerts and can exert a linear force on the actuating slide, for example in the compressed state, so that the actuating slide is moved—likewise linearly—by means of the force exerted by the spiral compression spring or is acted upon against said force by the actuating lever in order to lift the actuating slide off the sensor. The procedure here is advantageously such that the spiral spring is slipped onto a pin of the actuating slide on the foot side. On the head side, the spiral compression spring may be supported on a stationary stop. The stop can be designed as part of a housing of the motor vehicle latch.

According to a proposal of the invention with independent significance, it is provided that the sensor is a part of an electric component carrier. Such an electric component carrier usually contains one or more additional electric components in addition to a printed circuit board. These electric components can be additional sensors or switches, one or more electric motors, etc. The printed circuit board mentioned at this point is usually overmolded with plastics material. In addition, the design is advantageously such that the electric component carrier in question is or can be fixed to a housing or housing component that defines the electronics leg of the motor vehicle latch. This makes assembly particularly easy.

In addition, as part of the electric component carrier, the sensor assumes a defined position and can be placed and fixed, for example, as a switch in an associated exception of the electric component carrier.

As already explained, the motor vehicle latch or the signal derived from the sensor is advantageously used to control an external drive unit. This drive unit is usually a power window drive. In principle, other drives can also be controlled by means of the sensor signal generated by the sensor. In any case, the invention also relates to the combination of the motor vehicle latch described and to the external drive unit mentioned and in particular to the window drive. The overall sensor signal derived from the sensor ensures that, depending on the occurrence of the signal, the power window drive in the example ensures that an associated window pane or, in general, pane of a motor vehicle door is lowered immediately. As a result, the associated motor vehicle door can be opened easily, as is the case, for example, for convertibles, coupés with a frameless motor vehicle door, or comparable motor vehicles. As a result, the window pane has already left the seal before the motor vehicle latch and the motor vehicle door are opened.

Accordingly, the invention also relates to a motor vehicle door arrangement which is equipped with the aforementioned combination of the motor vehicle latch and the external drive unit or the power window drive. The motor vehicle door unit in question can accordingly be opened particularly easily and without problems, in particular if a frameless motor vehicle door is used at this point.

All of this is achieved by taking into account a structurally simple and functional design, which also opens up the possibility of being able to detect any malfunctions immediately. Since the sensor in question is advantageously designed as part of an electric component carrier, the assembly and installation are also possible without any problems, because only the electric component carrier and the actuating slide, which are implemented anyway, have to be installed for this purpose. This can therefore be done without major adjustments to existing motor vehicle latches. In addition, the actuating slide is generally designed as an injection molded part made of plastics material, so that the additional costs associated with the invention are kept to a minimum, in particular since the sensor is integrated into the electric component carrier, which is also made of plastics material anyway. Herein lie the substantial advantages.

BRIEF DESCRIPTION OF DRAWINGS

The invention is explained in greater detail below with reference to drawings which show only one exemplary embodiment. In the drawings.

DETAILED DESCRIPTION

The drawings show a motor vehicle latch that has an actuating lever 1, 2 in its basic structure. In fact, two actuating levers 1, 2 are implemented according to the exemplary embodiment, namely an outside actuating lever 1 and an inside actuating lever 2. Both actuating levers 1, 2 are connected to a handle (not expressly shown); for example, the outside actuating lever 1 is connected to an outside door handle, and the inside actuating lever 2 is connected to an inside door handle.

Figure 1:
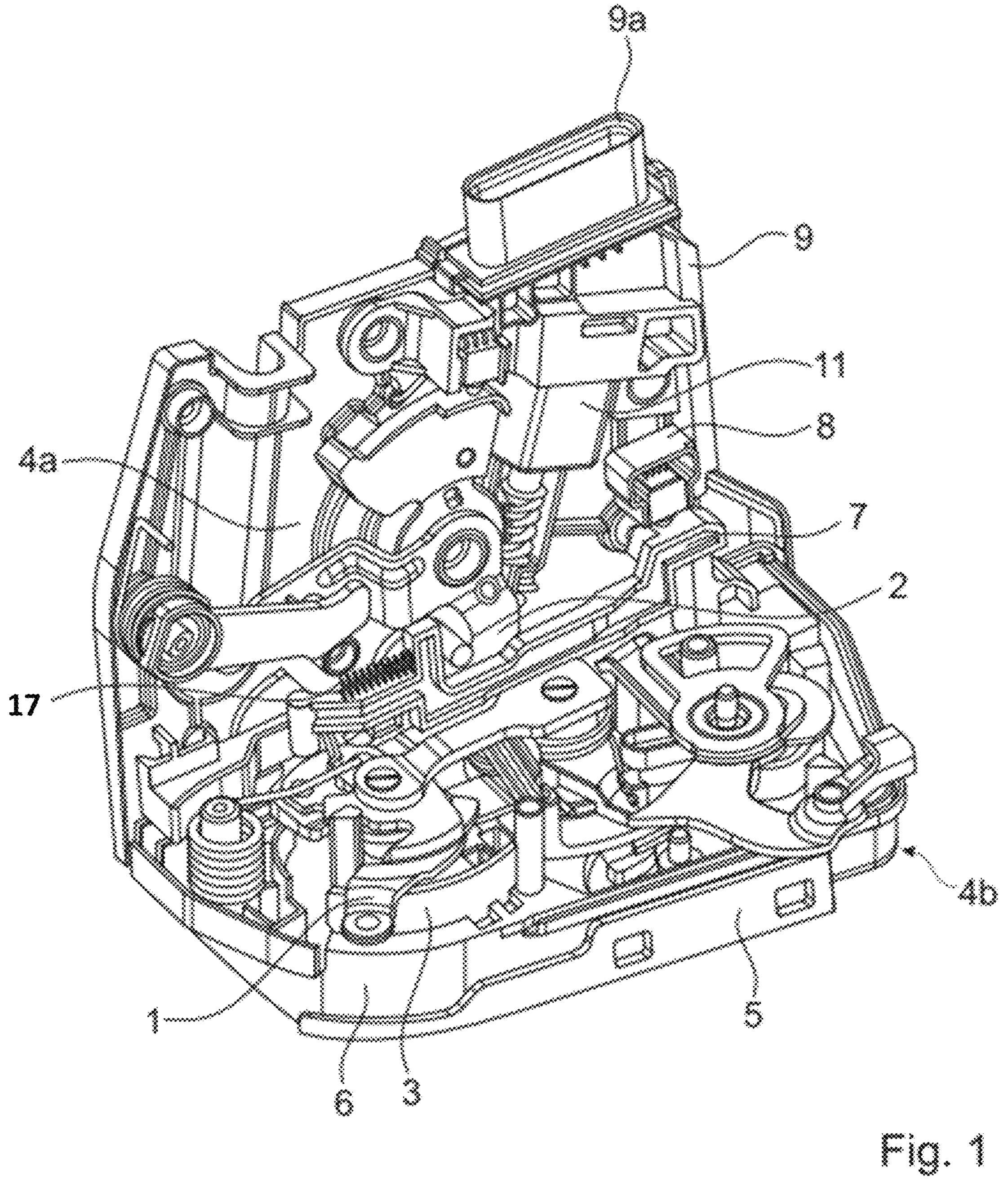
FIG. 1 is a perspective overview of the motor vehicle latch according to the invention.
Figure 2:
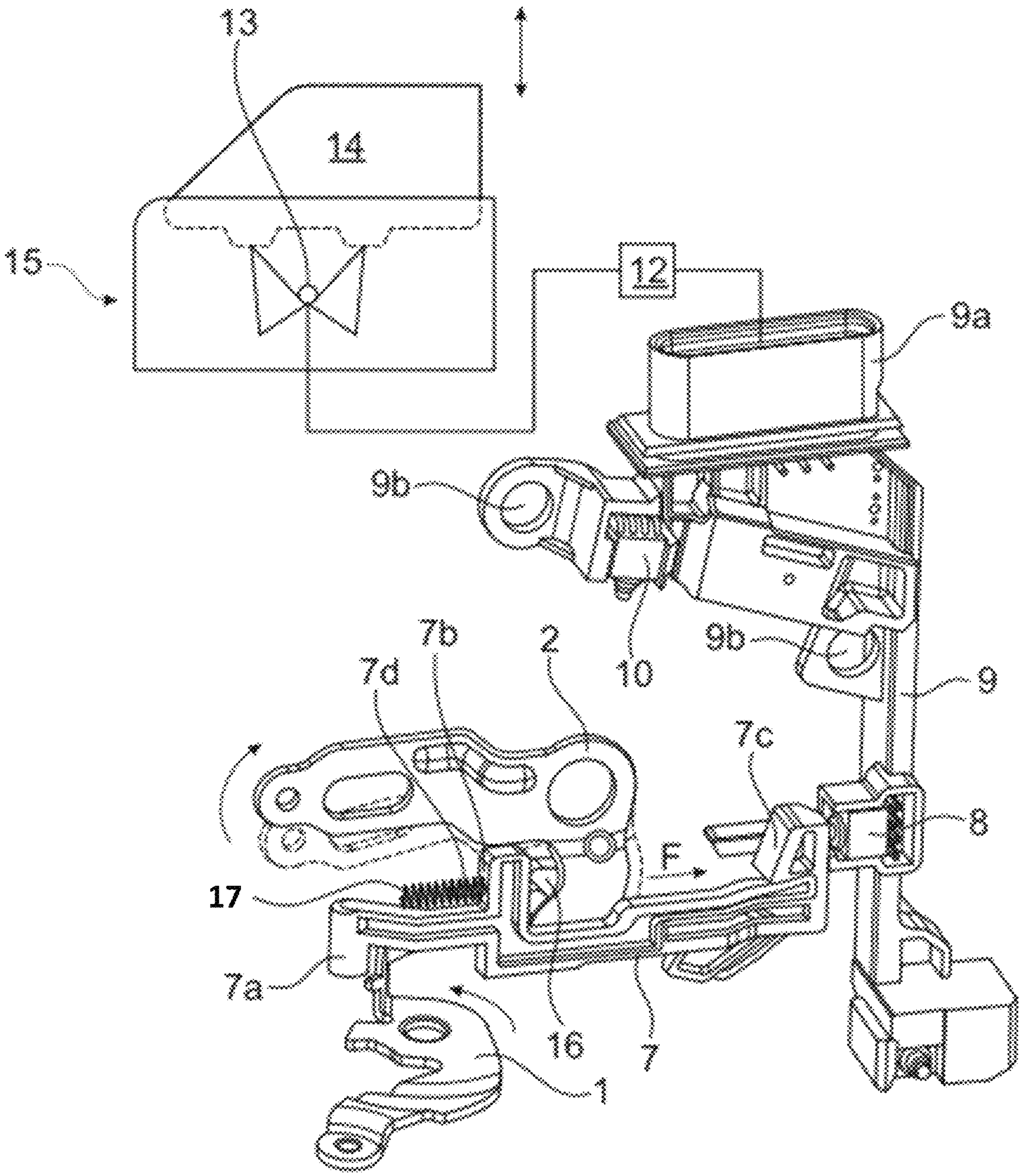
FIG. 2 shows the components of the motor vehicle latch according to FIG. 1, which are essential for the invention, in a slightly modified embodiment.

Both actuating levers 1, 2 serve according to the exemplary embodiment in particular for opening a locking mechanism 3, which is composed as is usual of a rotary latch and a pawl interacting therewith but is arranged under a cover in FIG. 1 and is therefore not visible. A comparison of FIGS. 1 and 2 shows that the motor vehicle latch has an overall L-shaped design in cross section and in this context has an upright electronics leg 4*a* in the exemplary embodiment and a latch leg 4*b* that is oriented horizontally in comparison. For this purpose, the latch leg 4*b* has a metal latch case 5, in which the previously mentioned locking mechanism 3 is rotatably mounted.

In contrast, the other components of both the electronics leg 4*a* and the latch leg 4*b* are predominantly made of plastics material, wherein, in this context, the electronics leg 4*a* is designed overall as a side cover 4*a* made of plastics material and the latch leg 4*b* has a further side cover 6 in addition to the latch case 5 as substantial structural features also made of plastics material.

The outside actuating lever 1 is arranged in the latch leg 4*b* and is mounted so that it can rotate about an axis which, according to the exemplary embodiment, is defined by a bearing mandrel anchored to the latch case 5. An opening movement of the outside actuating lever 1 now corresponds to a counterclockwise movement, as indicated by an arrow in FIG. 2. In contrast, the inside actuating lever 2 is located in or on the electronics leg 4*a* and, in this case, is mounted about an axis which in turn is anchored on or in the side cover 4*a* implemented in this context. According to the illustration in FIG. 2, an opening movement of the inside actuating lever 2 corresponds to the inside actuating lever 2 being pivoted clockwise about its axis. Both levers 1, 2 are consequently arranged in mutually perpendicular planes and are also pivoted in these mutually perpendicular planes to open the locking mechanism 3.

The basic and substantial structure also includes a linearly displaceable actuating slide 7, which, on the one hand, interacts with the actuating lever 1, 2 or both actuating levers 1, 2 and, on the other hand, acts upon a sensor 8. According to the invention, the actuating slide 7 is now assigned a spring 17 which ensures that the sensor 8 is permanently acted upon. Only an opening movement of the actuating lever 1, 2 ensures that the actuating slide 7 is lifted off the sensor 8.

The sensor 8 is designed according to the exemplary embodiment and substantially as part of an electric component carrier 9. The electric component carrier 9 has a plastics-coated and therefore not visible conductor path structure and is additionally equipped with further electric components or electronic components 10, 11, which are, for example, a further sensor 10 and, according to the exemplary embodiment, an electric motor 11 as well. In other words, the electric component carrier 9 ensures the electrical contacting of the sensor 8 as well as of the other electric components 10, 11. In addition, the electric component carrier 9 is equipped with a connection socket 9*a*, which connects the electric component carrier 9 and consequently the sensor 8 as well as the other electric components 10, 11 and thus the motor vehicle latch as a whole to a control unit 12 that is only indicated in FIG. 2.

The control unit 12 in turn serves to act upon an external drive unit 13, which is designed as a power window drive 13 according to the exemplary embodiment and corresponding to the illustration in FIG. 2. By means of the power window drive 13, a window pane 14 or a window of a motor vehicle door 15 can be lowered or raised along the double arrow shown in FIG. 2. According to the exemplary embodiment, the motor vehicle door 15 is designed to be frameless. In addition, the motor vehicle door 15 and the pane or window pane 14 together define a motor vehicle door arrangement 14, 15. The motor vehicle door arrangement 14, 15 is equipped with both the motor vehicle latch (as shown in FIG. 1) and the control unit 12 (not shown in detail for reasons of clarity). For this purpose, the motor vehicle latch as well as the control unit 12 and the external drive unit 13 are each inside the motor vehicle door 15.

It can be seen in particular from the illustration in FIG. 2 that the actuating slide 7 is equipped with a stop contour 7*a* for the outside actuating lever 1 and with a further stop contour 7*b* for the inside actuating lever 2. The two stop contours 7*a*, 7*b* are in each case folds. In addition, the actuating slide 7 is made entirely of plastics material, for example designed as an injection molded part made of plastics material. Another fold or stop contour 7*c* on the actuating slide 7 now ensures that the actuating slide 7 acts upon the sensor 8 permanently. The spring 17 is provided for this purpose.

In fact, within the scope of the exemplary embodiment and not restrictively, the spring 9 is a spiral compression spring which acts upon the actuating slide 7 with a linear force F indicated in FIG. 2 in the direction of the sensor 8. As a result, an actuating cam of the sensor 8, which is designed as a switch or microswitch, is permanently pressed down. An electric circuit that belongs to the sensor 8 and is to be checked by means of the control unit 12 is thus permanently closed in this way.

If, however, either the outside actuating lever 1 or the inside actuating lever 2 is acted upon, this results in the corresponding opening movement lifting the actuating slide 7 off the sensor 8. As a result of this, the previously mentioned electric circuit is interrupted and the control unit 12 interprets this as an opening signal for the associated actuating lever 1, 2. This opening signal is further processed by the control unit 12 such that, when the opening signal occurs, the external drive unit 13 or the power window drive 13 implemented at this point is activated in order to lower the window pane 14 slightly. As a result of this, the motor vehicle door 15 can be opened immediately and without any problems as soon as the locking mechanism 3 and thus also the motor vehicle door 15 have been transferred to their open state.

The signal of the sensor 8 is detected by the control unit 12 before a possible opening signal of the locking mechanism 3 which is also to be queried, so that the motor vehicle door 15 can be opened without any problems. The reason is that the window pane 14, which typically engages with a seal in a frameless motor vehicle door 15, has previously been lowered to such an extent that the motor vehicle door 15 can then be pivoted open manually by an operator without any problems when the locking mechanism 3 is open.

FIG. 2 shows that the inside actuating lever 2 interacts with the actuating slide 7 via a clutch element 16. The clutch element 16 may be designed as part of a locking unit, for example a safety unit in the form of a child safety device or anti-theft device. In any case, the opening actuation on the inside actuating lever 2 in the exemplary embodiment according to FIG. 2 and the associated pivoting movement of the inside actuating lever 2 in the clockwise direction shown there results in that not only the actuating slide 7 is lifted off from the sensor 8 but also in that the clutch element 16 becomes exposed. This can optionally be used in order to unlock the safety unit already mentioned, for example in a first stroke, so that the motor vehicle latch or locking mechanism 3 can be opened by means of a second stroke.

The spring 9 or spiral compression spring implemented at this point is mounted on a pin 7*d* of the actuating slide 7 or slipped onto this pin 7*d*, namely on the foot side, for perfect guidance and actuation of the actuating slide 7 with the linear force F indicated in FIG. 2. On the head side, the spring 9 or spiral compression spring is supported on a stationary stop (not shown). This stop may be provided by the side cover or electronics leg 4*a* or may be arranged thereon.

From a comparison of FIGS. 1 and 2, it can finally be recognized that the electric component carrier 9 is attached to the side cover or the electronics leg 4*a* for assembling. For this purpose, the electric component carrier 9 has fastening openings 9*b*, which are slipped onto associated pins on the side cover in question or the electronics leg 4*a* and are connected thereto. In addition, only the actuating slide 7 has to be assembled, so that assembly is particularly easy and quick and any adjustments are kept to a minimum.

LIST OF REFERENCE SIGNS

1 Outside actuating lever
1,2 Actuating lever
2 Inside actuating lever
3 Locking mechanism
4*a* Electronics leg, side cover
4*b* Latch leg
5 Latch case
6 Side cover
7 Actuating slide
7*a* Stop contour
7*b* Stop contour
7*c* Stop contour
7*d* Pin
8 Sensor
9 Spring, electric component carrier
9*a* Connection socket
9*b* Mounting holes
10 Sensor
10, 11 Electric components
11 Electric motor
12 Control unit
13 Drive unit, power window drive
14 Window pane
14, 15 Motor vehicle door arrangement
15 Motor vehicle door
16 Clutch element
F Linear force

The invention claimed is:

1. A motor vehicle latch comprising:
an actuating lever chain having at least one actuating lever for opening a locking mechanism,
a linearly movable actuating slide,
a sensor that is acted upon by the at least one actuating lever via the actuating slide, and
a spring directly acting on the actuating slide such that the actuating slide is biased by the spring into direct engagement with the sensor, and an opening movement of the at least one actuating lever acts against the spring to lift the actuating slide away from the sensor to entirely separate the actuating slide from the sensor,
wherein the at least one actuating lever comprises an outside actuating lever and an inside actuating lever, and
wherein the actuating slide has a first stop contour for the outside actuating lever and a second stop contour for the inside actuating lever.

2. The motor vehicle latch according to claim 1, wherein either an opening movement of the outside actuating lever, or an opening movement of the inside actuating lever, or an opening movement of both the outside and inside actuating levers lifts the actuating slide away from the sensor.

3. The motor vehicle latch according to claim 1, wherein the inside actuating lever interacts with the actuating slide via a clutch element.

4. The motor vehicle latch according to claim 1, wherein the spring acting on the actuating slide is a spiral compression spring.

5. The motor vehicle latch according to claim 4, wherein the spiral compression spring is positioned on a pin of the actuating slide on a foot side of the spiral compression spring and is supported on a head side of the spiral compression spring on a stop.

6. The motor vehicle latch according to claim 1, wherein the sensor is part of an electric component carrier having one or more electrical components in addition to the sensor.

7. The motor vehicle latch according to claim 1, wherein the sensor is a microswitch.

8. The motor vehicle latch according to claim 1, wherein the actuating slide is made of a plastic material.

9. The motor vehicle latch according to claim 1, wherein the motor vehicle latch has an L-shaped design including an electronics leg that has the inside actuating lever and a latch leg that has the outside actuating lever and that is oriented relative to the electronics leg to form the L-shaped design.

10. The motor vehicle latch according to claim 1, wherein the actuating slide further includes a third stop contour that directly engages with the sensor by pressing upon the sensor.

11. A motor vehicle door component comprising the motor vehicle latch according to claim 1 and an external drive unit for operating a moveable element.

12. A motor vehicle door arrangement comprising a motor vehicle door equipped with the motor vehicle door component according to claim 11.

13. The motor vehicle door arrangement according to claim 12, wherein the external drive unit is a power window drive and the moveable element is a vehicle window, and the power window drive raises or lowers the vehicle window.

14. The motor vehicle door arrangement according to claim 13, further comprising a control unit that detects a state of the sensor and operates the power window drive, wherein when the control unit detects that the at least one actuating lever is lifted to entirely separate from the sensor, the control unit generates an opening signal that controls the power window drive to open the vehicle window.

15. The motor vehicle door arrangement according to claim 12, further comprising a control unit that detects a state of the sensor and operates the external drive unit, wherein when the control unit detects that the at least one actuating lever is lifted to entirely separate from the sensor, the control unit generates an opening signal that controls the external drive unit to move the moveable element.

16. A motor vehicle latch comprising:
an actuating lever chain having at least one actuating lever for opening a locking mechanism,
a linearly movable actuating slide,
a sensor that is acted upon by the at least one actuating lever via the actuating slide, and
a spring directly acting on the actuating slide such that the actuating slide is biased by the spring into direct engagement with the sensor, and an opening movement of the at least one actuating lever acts against the spring to lift the actuating slide away from the sensor to entirely separate the actuating slide from the sensor,
wherein the at least one actuating lever comprises an outside actuating lever and an inside actuating lever, and
wherein the motor vehicle latch has an L-shaped design including an electronics leg that has the inside actuating lever and a latch leg that has the outside actuating lever and that is oriented relative to the electronics leg to form the L-shaped design.

* * * * *